United States Patent [19]

Kunz

[11] 4,184,556

[45] Jan. 22, 1980

[54] BALANCE WITH ELECTROMAGNETIC COMPENSATION

[75] Inventor: Peter Künz, Tann-Ruti, Switzerland

[73] Assignee: Mettler Instrumente AG, Greifensee, Switzerland

[21] Appl. No.: 952,636

[22] Filed: Oct. 19, 1978

[30] Foreign Application Priority Data

Dec. 6, 1977 [CH] Switzerland ............ 14889/77

[51] Int. Cl.² .................................. G01G 7/02
[52] U.S. Cl. .......................... 177/210 EM; 177/212
[58] Field of Search .......... 177/212, 210 EM, 210 R, 177/229, DIG. 5

[56] References Cited

U.S. PATENT DOCUMENTS

| | | | |
|---|---|---|---|
| 3,688,854 | 9/1972 | Strobel | 177/212 X |
| 4,148,370 | 4/1979 | Luchinger | 177/212 X |

Primary Examiner—Joseph W. Hartary
Attorney, Agent, or Firm—Toren, McGeady and Stanger

[57] ABSTRACT

An electromagnetically compensated balance whose magnetic circuit comprises a permanent magnet and a pole shoe associated with each of the two poles of the magnet, one of the pole shoes bounding an air gap in the circuit, includes an induction coil mounted for movement in the air gap, a load carrier movable relative to the circuit under the weight of a carried load, and a force transmitting train connecting the coil to the load carrier for balancing the force exerted by the carried load on the load carrier by a force generated by current flowing in the coil. The force transmitting train includes a force transmitting member fastened to the coil. At least a major portion of the force transmitting member is confined in a space defined between the air gap and the other pole shoe.

7 Claims, 4 Drawing Figures

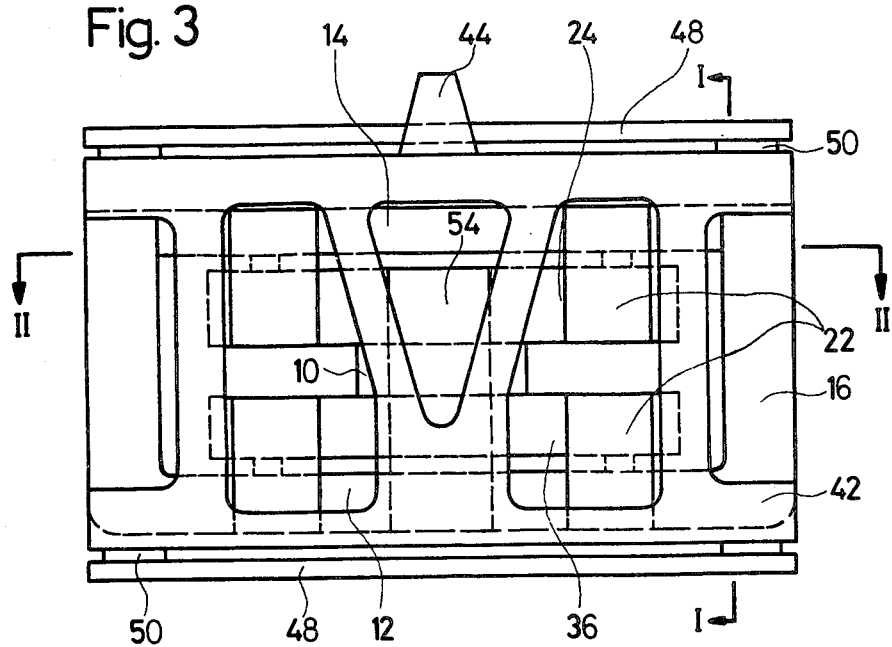
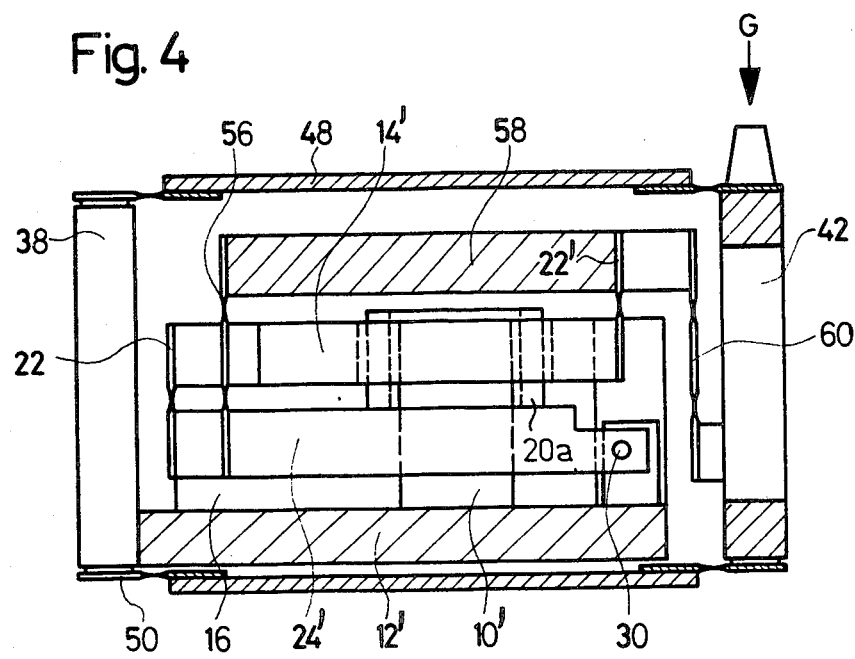

BALANCE WITH ELECTROMAGNETIC COMPENSATION

This invention relates to a balance with electromagnetic compensation in which the force exerted on a load carrier by the load to be weighed is compensated by the current flowing in an induction coil moving in the air gap of a magnetic circuit, and particularly to an improvement in a balance of this type known, for example, from Swiss Pat. No. 591,685 and U.S. Pat. No. 3,688,854.

The known balances with electromagnetic compensation are relatively bulky and heavy. It is a primary object of this invention to modify the known balance so as to make it more compact, particularly to reduce the height thereof.

According to this invention, at least a major portion of the force transmitting member which carries the coil and connects it to the load carrier, thus permitting the force of gravity exerted by a weighed object to be compensated by electric current flowing in the coil, is confined within the magnetic circuit, more specifically in a space defined between one pole shoe an air gap bounded by the other pole shoe, the two pole shoes being associated respectively with the two poles of the permanent magnet core in the circuit.

Other features, additional objects, and many of the attendant advantages of this invention will readily be appreciated as the same becomes better understood by reference to the following description of preferred embodiments when considered in connection with the appended drawing in which:

FIG. 3 illustrates the balance of FIGS. 1 and 2 in fragmentary front elevation; and FIG. 4 shows another balance of the invention in a view similar to that of FIG. 1.

Figure 1:
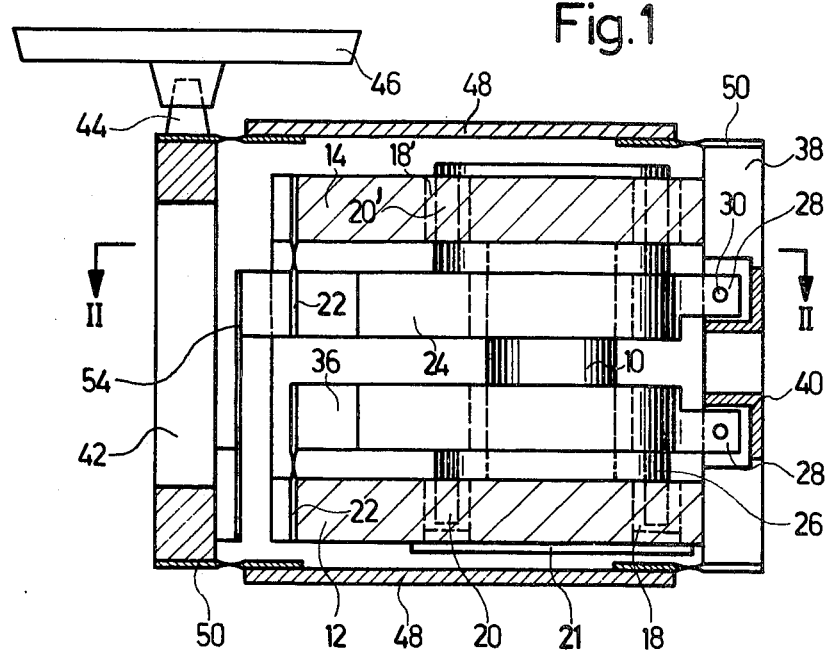
FIG. 1 shows a balance of the invention in side elevational section on the line I—I in FIG. 2.
Figure 2:
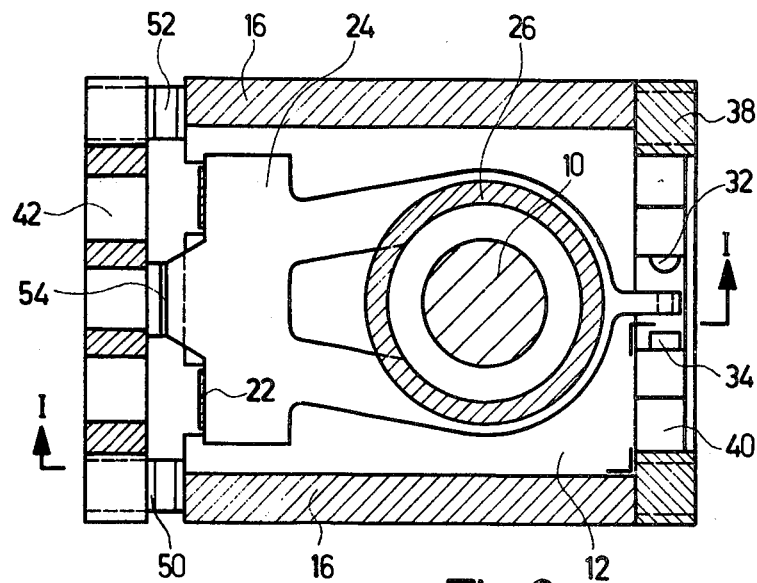
FIG. 2 is a top plan view of the balance of FIG. 1 taken in section on the line II—II in FIG. 1 and FIG. 3.

Referring initially to FIGS. 1 to 3, there is shown only as much of a balance as is necessary for an understanding of the invention. The non-magnetic casing which normally conceals much of the illustrated structure from view and supports the operating elements of the balance has been omitted.

The permanent magnet core 10 of the magnetic circuit in the balance is of stepped cylindrical shape and has an axis which is upright in the illustrated operative position of the balance. The enlarged axial ends or poles of the core 10 are radially separated by annular air gaps 18, 18' from radially aligned, associated pole shoes 12, 14 which are heavy, planar, parallel plates of ferrous metal connected by vertical side walls 16, of the same material. In the illustrated embodiment, the side walls 16 and the lower pole shoe 12 are integral parts of a unitary body of iron. The core 10 is supported on the pole shoe 12 by means of a circular brass plate 21 attached to the pole shoe and provided with a centering rib on its top face which fits into the air gap 18. As is not specifically shown, the side walls 16 are attached to the non-illustrated casing.

Induction coils 20, 20' are movably received in the air gaps 18, 18'. A two-armed lever 24 of non-magnetic material is fulcrumed on the pole shoe 14 as a balance beam by means of two resilient straps 22 extending in a common vertical plane in the illustrated equilibrium condition of the balance. The upper ends of the horizontally spaced straps 22 are fixedly attached to the pole piece 14, the lower ends to the lever 24. The longer arm of the lever 24 is partly annular and spacedly envelops the core 10. A cylindrical carrier 26 for the coil 20' is coaxially mounted on the annular arm portion. The free end of the longer lever arm is an upright vane 28 of sheet material formed with a horizontal bore 30. A small light bulb 32 and a photoelectric cell 34 near opposite ends of the bore 30 generate a signal indicative of the illustrated equilibrium position of the lever 24.

The other induction coil 20 is supported on an arm 36 virtually identical with the longer arm of the lever 24. One end of the arm 36 is pivotally mounted between the pole shoe 12 and the lever 24 on two resilient straps 22 extending upward from the pole shoe 12, and the other end of the arm 36 constitutes an apertured vane 28 cooperating with a light bulb and a photoelectric cell, not specifically illustrated, and located at opposite ends of the aperture 30 in the manner described above with reference to the lever 24.

The two sets of photoelectric equilibrium indicators are mounted on respective horizontal rails 40 of L-shaped cross section between two upright iron columns 38. The columns are fixedly attached to the side walls 16 and thereby to the supporting structure of the balance.

The ends of the columns 38 project vertically beyond the side walls 16 and are connected by eight flexible straps 50, 52 and two plate-shaped links 48 in a double parallelogram suspension system to a rigid load carrier frame 42. An upwardly tapering projection 44, centered on the carrier 42, normally engages a mating socket on the underside of a balance pan 46 as is shown in FIG. 1 only.

The coil 20' and the associated photoelectric cell 34 are the only illustrated elements of an electric compensation circuit, known from the commonly owned U.S. Pat. No. 3,688,854, which varies the current through the coil 20' until the photoelectric cell 34 indicates equilibrium, and indicates the magnitude of the necessary coil circuit as a measure of the load on the pan 46.

The coil 20 permits elimination of errors due to aging of the permanent magnet core 10, to temperature changes, and the like. The current necessary for adjusting the arm 36 to the illustrated equilibrium condition provides a reference or null signal that may be superimposed on the weighing circuit to compensate for errors.

The balance described with reference to FIGS. 1–3 differs from analogous known balances relying on electromagnetic compensation by its compactness, particularly by its relatively small height made possible by the mounting of the balance beam 24 vertically in the space defined between the air gap 18', which receives the associated coil 20', and the pole shoe 12 at the other axial end or pole of the core 10. The annular portion of the beam 24 which envelops the core 10 is symmetrical relative to a vertical plane through the axis of the core, an arrangement which minimizes potentially harmful effects of temperature gradients in the balance and favors uniform distribution of mechanical stresses.

The assembly of the balance is greatly facilitated by the connected pole shoes 12, 14 and side walls 16 which provide ready access to the movable elements of the balance. While the side walls 16 have been shown and described to be integral with the lower pole shoe 12, analogous advantages are achieved with an arrangement in which the side walls 16 are integral with the upper pole shoe 14 or with both pole shoes. If it is desired to reduce the width of the load carrier 42 transverse to the beam 24, the side walls 16 may converge from the columns 38 toward the load carrier at an acute angle.

The columns 38 consist of iron and are thus elements of the magnetic circuit. Except for the linking plates 48 and the load carrier 42 with the weighing pan 46, all operating elements of the balance are thus confined in a space encompassed by the magnetic circuit. Even the equilibrium indicators associated with the vanes 28 are located within this space, as are the arm 36 and associated reference structure.

The balance illustrated in FIG. 4 is intended for the weighing of loads much greater than those within the capacity of the device described above with reference to FIGS. 1-3, but has many features common to the first-described balance. One pole of a cylindrical, permanent magnet core 10' is fixedly mounted on a pole shoe 12', and the other bounds an annular air gap with the other pole shoe 14'. The pole shoes are fixedly connected by side walls 16.

An induction coil 20a in the air gap between the pole shoe 14' and the core 10' is supported on an annular portion of a one-armed lever 24' in the manner described with reference to FIG. 2. One end of the lever is suspended from the pole shoe 14' by a resilient strap 22, the other end is vane-shaped and has a horizontal bore 30 for indicating its equilibrium position in cooperation with a light bulb and photoelectric cell, not themselves shown in FIG. 4, but corresponding to the analogous devices described above.

A two-armed lever 58 is fulcrumed on the pole shoe 14' by means of a resilient strap 22'. The end of its longer arm is connected with a portion of the lever 24' spacedly adjacent the strap 22 by a resilient strap 56, whereas it short arm is linked to a load carrier 42 by a strap 60. The positions of the several suspensions and pivots connecting the levers 24' and 58 to each other and to the pole shoe 14' are readily chosen to cause a movement of the bore 30 and of the coil 20a which is 100 times the simultaneous movement of the load carrier 42 and of a weighing pan, not itself illustrated, which transmits the weight of a load to the carrier 42 as indicated by an arrow G.

As illustrated, the strap 22' is stressed in compression between the lever 58 and the pole shoe 14'. While flexible, resilient straps in present use as flexural pivots in balances may be employed in such a manner, the strap may be replaced by an upstanding bracket on the pole shoe 14' from which the lever 58 may be suspended by means of a flexible strap stressed in tension in an obvious manner. The strap 22 connecting the pole shoe 12 with the arm 36 in FIG. 1 may be replaced by a similar suspension arrangement if desired.

What is claimed is:

1. In electromagnetically compensated weighing apparatus including a magnetic circuit comprising a permanent magnet having two poles, and a pole shoe associated with each pole, one of said pole shoes bounding an air gap in said circuit; an induction coil mounted for movement in said air gap; a load carrier movable relative to said magnetic circuit under a carried load; and force transmitting means connecting said coil to said carrier for balancing the force exerted by said carried load on the load carrier by a force generated by current flowing in said coil, the improvement in said force transmitting means which comprises a force transmitting member fastened to said coil, at least a major portion of said force transmitting member being confined in a space defined between said air gap and the other pole shoe.

2. In apparatus as set forth in claim 1, said force transmitting member having an annular portion enveloping said magnet and carrying said coil.

3. In apparatus as set forth in claim 1, said magnetic circuit further comprising two side walls of ferrous metal connecting said pole shoes.

4. In apparatus as set forth in claim 3, one of the said pole shoes and said side walls constituting a unitary piece of ferrous metal.

5. In apparatus as set forth in claim 1, indicating means on said portion of said force transmitting member for indicating the balancing of said forces.

6. In apparatus as set forth in claim 1, said other pole shoe bounding another air gap in said magnetic circuit, another induction coil in said other air gap, and a supporting member movably secured to said other pole shoe in said space and carrying said other coil.

7. In apparatus as set forth in claim 1, said force transmitting means further including a two-armed lever located contiguously adjacent said magnetic circuit, said lever having a shorter arm operatively connected to said load carrier and a longer arm operatively connected to said force transmitting member.

* * * * *